United States Patent Office 2,783,263
Patented Feb. 26, 1957

2,783,263

HALOCARBOXYSILANES

Robert L. Merker, Pittsburgh, Pa., assignor to Dow Corning Corporation, Midland, Mich., a corporation of Michigan No Drawing. Application November 22, 1954,
Serial No. 470,531

8 Claims. (Cl. 260—448.2)

This invention relates to siloxanes and silanes having halocarboxymethyl groups attached to the silicon.

It is known that halophenyl groups attached to silicon in siloxane molecules improve the lubricity of siloxanes. In addition it has been found that when the halophenyl radical is on the end of the siloxane chain, improved lubricity is obtained without sacrificing substantially the desirable temperature viscosity coefficient of the siloxane. However, present methods of preparing materials having the halophenyl group on the end of the chain are cumbersome and quite expensive. The present method provides an economically feasible way of producing such materials.

It is the object of the present invention to prepare novel compositions of matter which show improved lubricity without sacrificing the other desirable properties of organopolysiloxanes. Other objects and advantages will be apparent from the following description.

This invention relates to silanes and siloxanes of the average general formula

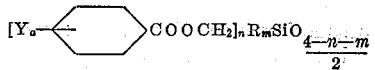

in which Y is chlorine or bromine, $a$ has a value from 1 to 5 inclusive, $n$ has a value from 1 to 2 inclusive, $m$ has a value from 0 to 3 inclusive, $m+n$ has a value of from 1 to 4 inclusive, and R is a monovalent hydrocarbon radical or halogenated aryl hydrocarbon radical. The invention includes copolymeric organosiloxanes containing at least one polymeric siloxane unit of the above formula per molecule, wherein $m+n$ has a value of from 1 to 3 inclusive.

The compounds of this invention are prepared by reacting the alkali metal salts of halogenated benzoic acids with halomethylsiloxanes having 1 or 2 halomethyl groups per silicon atom or with the comparable halomethylsilanes in which all valences not satisfied by the halomethyl radicals are satisfied by the above-defined R radicals. The reaction may be represented schematically by the equation

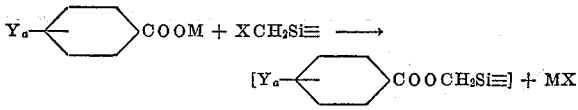

This reaction is best carried out in solvents such as dimethyl formamide, pyridine, ethers, aliphatic and aromatic hydrocarbons and acetonitrile. In general, the reaction goes best when the reactants are heated above 50° C. and is usually carried out at the reflux temperature of the solvent.

For the purpose of this invention any halogenated benzoic acid having at least 1 chlorine or bromine atom substituted on the phenyl ring can be employed. Specific examples of operative materials are the alkali metal salts of monochlorobenzoic acid, pentachlorobenzoic acid, monochloromonobromobenzoic acid and trichlorobenzoic acid.

In the siloxanes of this invention R can be any monovalent hydrocarbon radical such as alkyl radicals such as methyl, ethyl, and octadecyl; alkenyl radicals such as vinyl and allyl; cycloaliphatic hydrocarbon radicals such as cyclohexyl and cyclohexenyl; aralkyl hydrocarbon radicals such as benzyl; aryl hydrocarbon radicals such as phenyl, xenyl and tolyl; and halogenated aryl hydrocarbon radicals such as chlorophenyl, bromoxenyl, and $\alpha,\alpha,\alpha$-trifluorotolyl.

The halomethylsiloxanes employed in the method of this invention may be prepared by direct halogenation of methyl siloxanes or of methylchlorosilanes. In the latter case the chlorosilane is then hydrolyzed to the siloxane. In those cases where the R groups are susceptible to chlorination it is best first to halogenate a methylchlorosilane and thereafter react the halomethylchlorosilane with RMgX in which R is the desired hydrocarbon radical.

The siloxanes of this invention can be copolymerized with siloxanes of the formula $$R'_z SiO_{\frac{4-z}{2}}$$

in which R' is hydrogen, a monovalent hydrocarbon radical, or a halogenated monovalent hydrocarbon radical and $z$ has a value from 0 to 3 inclusive. These copolymers may be prepared by catalytic acid copolymerization of the various siloxanes. An alternative method is to react the alkali metal salts of the above benzoic acids with a siloxane in which only some of the silicon atoms have halomethyl groups attached thereto.

Specific examples of R' groups which can be in the copolymers of this invention are hydrogen, aliphatic hydrocarbon radicals such as methyl, ethyl, octadecyl, vinyl, allyl; cycloaliphatic hydrocarbon radicals such as cyclohexyl and cyclohexenyl; aryl hydrocarbon radicals such as benzyl, phenyl, tolyl and xenyl and halogenated hydrocarbon radicals such as trifluorovinyl, tetrafluoroethyl, chlorophenyl, chlorotolyl, $\alpha,\alpha,\alpha$-trifluorotolyl and bromonaphthyl. It should be understood that the copolymers of this invention also include those containing $SiO_2$ units. In all cases in the copolymers of this invention there should be at least 1 siloxane unit containing a halophenoxymethyl radical, per molecule.

The siloxanes and silanes of this invention are useful as lubricants and as additives for lubricants.

The following examples are illustrative only and should not be construed as limiting the invention which is properly delineated in the appended claims. The symbols "Me" and "Ph" are used in the examples and claims to represent methyl and phenyl radicals respectively.

*Example 1*

188 g. of the potassium salt of 4,5-dichlorobenzoic acid, 87 g. of symmetrical bis-chloromethyltetramethyldisiloxane was refluxed in 55 g. of dimethylformamide for 2 hours. The resulting solution was filtered free of potassium chloride and the solvent was removed to give a 90 percent yield of the product

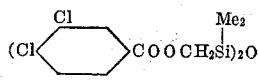

melting point 55° C.

One mol of this disiloxane product was equilibrated with 1 mol of octamethylcyclotetrasiloxane by mixing the two and adding thereto about 5 per cent by weight concentrated $H_2SO_4$ and allowing the mixture to stand at room temperature for 24 hours. The resulting copolymer was diluted with benzene, washed to remove all the acid and dried and the benzene was then removed. The resulting product was a fluid having the average formula

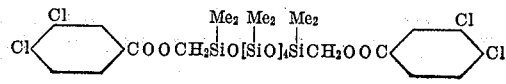

and having the following properties: $n_D^{25}$ 1.4850, $d_4^{25}$ 1.152, sp. ref. .249, viscosity at 25° C. 31.2 cs.

One mol of the above disiloxane was equilibrated with 1 mol of tetramethyltetraphenylcyclotetrasiloxane in the same manner. The resulting product was a copolymer having the average formula

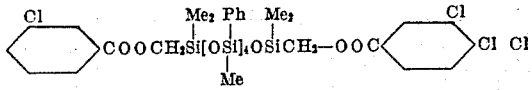

which had the following properties: $n_D^{25}$ 1.5322, $d_4^{25}$ 1.219, sp. ref. .254, viscosity at 25° C. 621 cs.

Example 2

102 g. of the potassium salt of 4,6-dichlorobenzoic acid was reacted with 50.5 g. of symmetrical bis-chloromethyltetramethyldisiloxane in the manner of Example 1. The resulting product was the compound of the formula

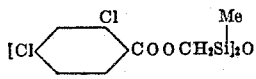

which was a light yellow liquid having an $n_D^{25}$ 1.5357, $d_4^{25}$ 1.275, sp. ref. .245.

This product was equilibrated with octamethylcyclotetrasiloxane in accordance with the method of Example 1 and the resulting product had the average formula

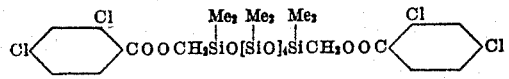

which had the following properties: $n_D^{25}$ 1.4850, $d_4^{25}$ 1.153, sp. ref. .249, viscosity at 25° C. 202 cs.

One mol of this disiloxane was also equilibrated with 1 mol of tetramethyltetraphenylcyclotetrasiloxane in accordance with the method of Example 1. The resulting material was a copolymer of the average molecular formula

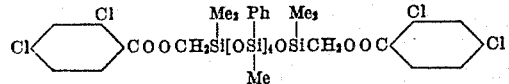

which had the following properties: $n_D^{25}$ 1.5336, sp. ref. 1.212, viscosity at 25° C. 188 cs.

All of the fluids of the Examples 1 and 2 showed improved lubricity for steel bearing surfaces.

Example 3

When chloromethylheptamethylcyclotetrasiloxane is reacted with the sodium salt of tribromobenzoic acid the compound tribromophenylcarboxymethylheptamethylcyclotetrasiloxane is obtained.

Example 4

When the sodium salt of pentachlorobenzoic acid is reacted with a copolymer of 5 mol percent chloromethylsiloxane, 94 mol percent phenylmethylsiloxane and 1 mol percent vinyldimethylsiloxane in accordance with the procedure of Example 1, a copolymer of 5 mol percent pentachlorophenylcarboxymethylsiloxane, 94 mol percent phenylmethylsiloxane and 1 mol percent vinyldimethylsiloxane is obtained.

Example 5

When the sodium salt of parachlorobenzoic acid is reacted with a copolymer of 1 mol percent chloromethyldimethylsiloxane, 90 mol percent dimethylsiloxane and 9 mol percent chlorophenylmethylsiloxane in the manner of Example 1, a copolymer having the composition 1 mol percent parachlorophenylcarboxymethyldimethylsiloxane, 90 mol percent dimethylsiloxane and 9 mol percent chlorophenylmethylsiloxane is obtained.

Example 6

When 1 mol of the sodium salt of 4,5-dichlorobenzoic acid is reacted with 1 mol of chloromethyl cyclohexyl octadecyl allyl silane in accordance with the procedure of Example 1, the compound 4,5-dichlorophenylcarboxymethyl cyclohexyl octadecyl allyl silane is obtained.

Example 7

When 4 mols of the potassium salt of 4,5-dichlorobenzoic acid is reacted with 1 mol of tetrachloromethyldimethyldisiloxane in the manner of Example 1 the compound

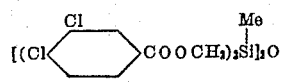

is obtained.

That which is claimed is:

1. An organosilicon compound having the average general formula

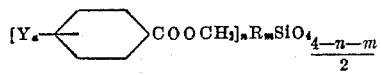

in which Y is of the group consisting of chlorine and bromine, $a$ has a value from 1 to 5 inclusive, $n$ has a value from 1 to 2 inclusive, $m$ has a value from 0 to 3 inclusive, $m+n$ has a value of from 1 to 4 inclusive and R is of the group consisting of alkyl, aryl, aralkyl, cycloaliphatic, halogenated aryl, and alkenyl radicals.

2. 
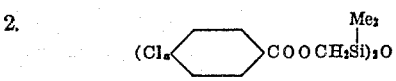

where $a$ has a value from 1 to 5 inclusive.

3. 
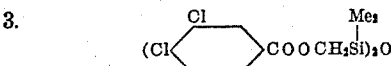

4. 
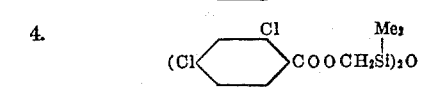

5. An organosiloxane having per molecule at least one siloxane unit of the formula

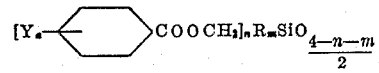

in which Y is of the group consisting of chlorine and bromine, $a$ has a value from 1 to 5 inclusive, $n$ has a value from 1 to 2 inclusive, $m$ has a value from 0 to 3 inclusive, $m+n$ has a value of from 1 to 3 inclusive and R is of the group consisting of alkyl, aryl, aralkyl, cycloaliphatic, halogenated aryl, and alkenyl radicals, any remaining siloxane units in said organosiloxane being of the formula $$R'_zSiO_{\frac{4-z}{2}}$$

in which R' is selected from the group consisting of alkyl, aryl, and alkenyl radicals, halogenated derivatives of any of such radicals, aralkyl and cycloaliphatic radicals and hydrogen atoms, and $z$ has a value of from 0 to 3, inclusive.

6. 
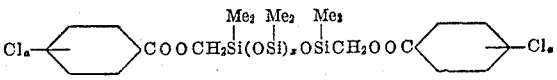

in which x is an integer of at least one and $a$ has a value from 1 to 5 inclusive.

7. 
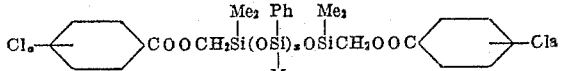

in which $x$ has a value of at least 1 and $a$ has a value from 1 to 5 inclusive.

8. An organosilicon compound selected from the group consisting of (1) organosiloxane polymers having per molecule at least one siloxane unit of the formula

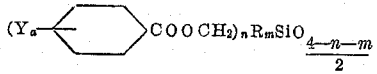

in which Y is selected from the group consisting of chlorine and bromine, $a$ is an integer from 1 to 5, inclusive, $n$ is an integer from 1 to 2, inclusive, $m$ is an integer from 0 to 3, inclusive, $m+n$ has a value of from 1 to 3, inclusive, and R is selected from the group consisting of alkyl, aryl, aralkyl, cycloaliphatic, halogenated aryl and alkenyl radicals, any remaining siloxane units in said polymer being of the formula

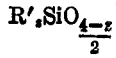

in which $R'$ is selected from the group consisting of alkyl, aryl and alkenyl radicals, halogenated derivatives of any of such radicals, aralkyl and cycloaliphatic radicals and hydrogen atoms, and $z$ is an integer of from 0 to 3, inclusive, and (2) organosilicon compounds having the formula

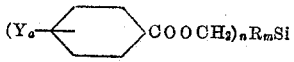

in which Y, $a$, $n$, and $m$ are as above defined and $m+n$ has a value of 4.

No references cited.